March 24, 1959
R. A. FRYKLUND
2,879,459
RESTORING ANGULAR COINCEDENCE OF SYNCHRO SERVOSYSTEM ROTORS
Filed June 28, 1955
2 Sheets-Sheet 1
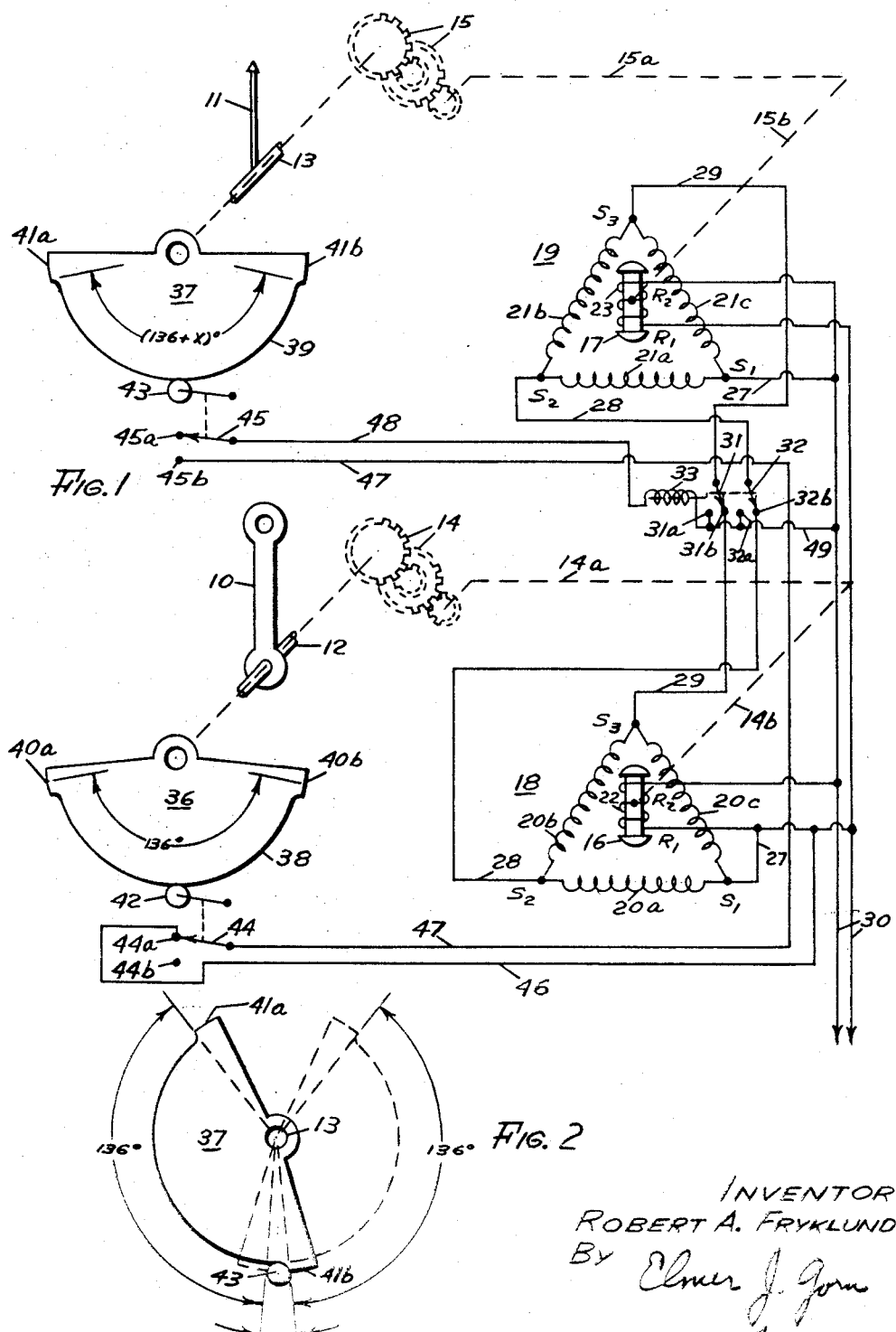
INVENTOR
ROBERT A. FRYKLUND
BY
ATTORNEY

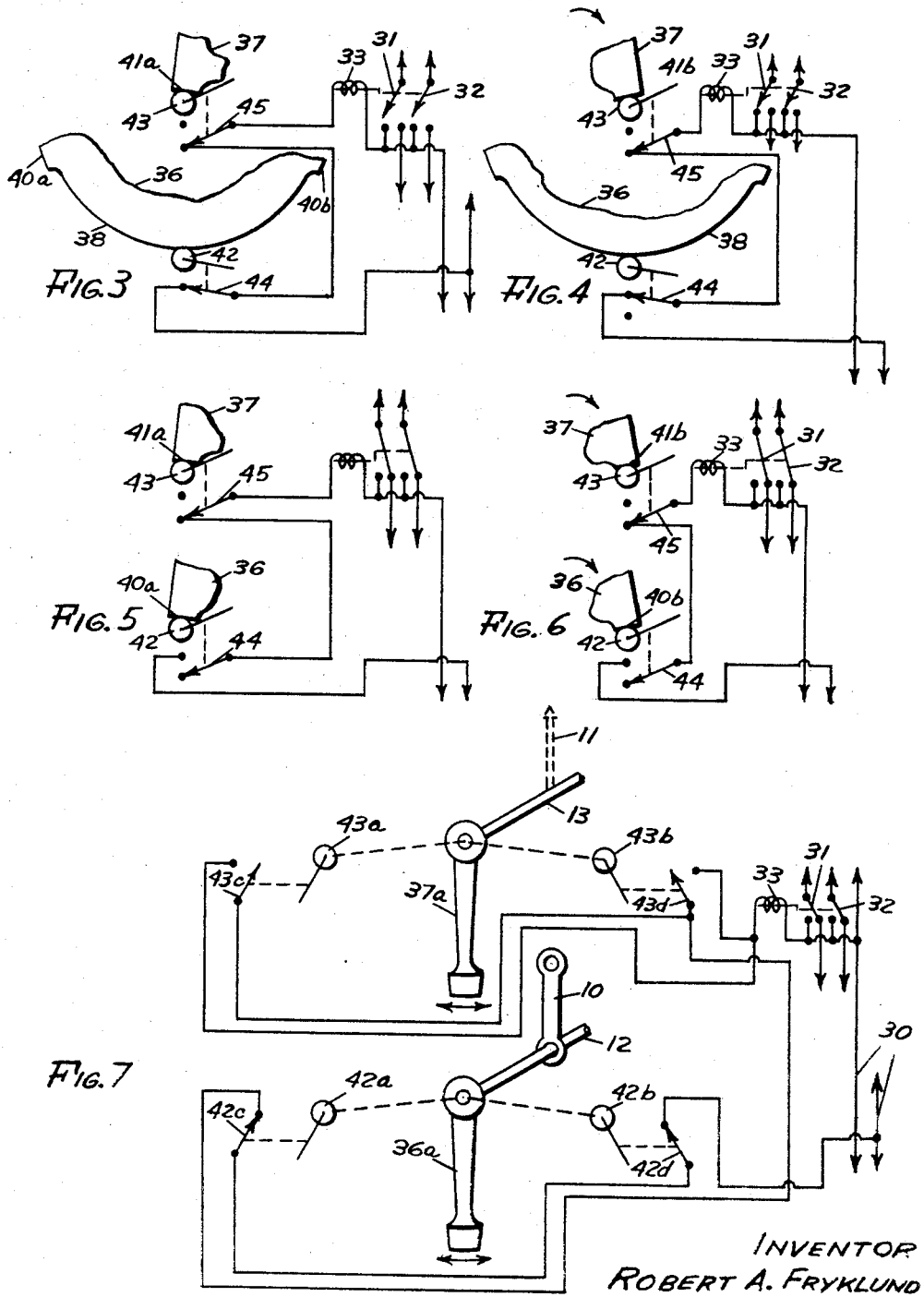

United States Patent Office 2,879,459
Patented Mar. 24, 1959

2,879,459

RESTORING ANGULAR COINCIDENCE OF SYNCHRO SERVOSYSTEM ROTORS

Robert A. Fryklund, Johnson City, N.Y., assignor to Raytheon Manufacturing Company, Waltham, Mass., a corporation of Delaware Application June 28, 1955, Serial No. 518,549

8 Claims. (Cl. 318—24)

This invention relates to the reproduction, at a given point, of a motion originating at a different point, remote from the first; and more particularly to the control and correction of deviations of the motion reproducing element from true synchronism (phase correlation) with the motion generating element.

The invention resides in a control method and means whereby (a) the degree of permissible deviation on the part of the motion reproducing element is limited to a predetermined proportion of the total distance intervening between two extreme positions marking the limits of a fixed path prescribed for said motion reproducing element; and (b) a restoration of synchronism is accomplished by an "unlocking and coupling" technique (hereinafter explained) as the motion generating element arrives at a predetermined position in its fixed path of travel, in the course of the particular cycle of motion upon which it is proceeding when the deviation occurs, or becomes significant. A further facet of the present invention is the accomplishment of such synchronism restoration with respect to elements whose fixed path is an arc of less than 360 degrees, and whose motion is an oscillatory, or shuttle, motion rather than a rotary one. This last-mentioned point is important, in that prior art synchronizing systems have been capable of "unlocking and coupling" only when the motion generating element has been of the continuously rotating type.

Other characteristics and capabilities of the invention will be apparent as the description thereof progresses, reference being had to the accompanying drawings wherein:

Fig. 1 is a schematic representation of apparatus embodying the invention;

Fig. 2 is a diagram showing one of the elements of the Fig. 1 apparatus in a different position, representing one extremity in its normal cyclic path;

Figs. 3, 4, 5, and 6 show diagrammatically four different conditions that are encountered in use of the apparatus illustrated in Fig. 1; and Fig. 7 illustrates an alternate arrangement of certain of the components of Fig. 1.

In Fig. 1 the reference numerals 10 and 11 designate two more or less widely separated elements fixedly mounted on shafts 12 and 13, respectively, adapted to oscillate about their respective axes as the motion imparted to "master" element 10 (by any associated work-performing member, not shown) is transmitted to "slave" element 11 (which may be the index pointer of an indicating instrument, or another work-performing unit) by way of the interposed mechanical and electrical motion-transmitting elements 14, 18, 19, and 15, in the order named.

As illustrated in Fig. 1, elements 14 and 15 are identical speed-changing gear trains whose "low-speed" ends operatively connect with the above-described shafts 12 and 13, respectively, and whose "high speed" ends 14a and 15a operatively connect with the shafts 14b and 15b, respectively, of the rotors 16 and 17, respectively, of dynamo-electric units 18 and 19 of the well known self-synchronous type, of which the unit 18, as here connected, constitutes the "synchro-generator" of the system, while the unit 19, as here connected, constitutes the "synchro-motor," that is, its rotor 17 will be induced to follow and reproduce the angular motions, in either direction, of the rotor 16 by reason of the magnetic flux behavior and the resulting voltages induced in the stator windings 20a, b and c and 21a, b and c, which are electrically interconnected as indicated at 27, 28 and 29, as are also the rotor windings 22 and 23, by way of the comon energy source constituted by lines 30. The terminals $S_1$, $S_2$, and $S_3$ of the stator windings are shown as being arranged in delta formation, although Y connections could be substituted, both arrangements being common in the art. The stator interconnections 27 are shown as including one side of power source 30 but, alternatively, could be directly between the two appropriate stator terminals, as are the interconnections 28 and 29.

The invention, as above indicated, involves the provision of "uncoupling and locking" means to permit relative motion between the two halves of the system when necessary to restore identity of angular positioning of the "master" and "slave" elements 10 and 11; and to permit unlocking and recoupling when such identity of positions is restored. Such means includes a solenoid 33 or equivalent electromagnetic or electronic means for controlling the movement of switch elements 31 and 32, and a pair of switch operating cams 36 and 37, or equivalent devices, physically integrated with shafts 12 and 13, respectively, for operative engagement with striker pins 42 and 43, respectively, at certain stages of the operation, and under certain conditions, to be described. Pins 42 and 43 constitute parts of switch assemblies 44 and 45, respectively, whose circuit controlling elements are movable between two positions, a and b, to control flow of current from source 30 to relay 33, by way of conductors 46, 47, 48 and 49. So long as pins 42 and 43 bear against the recessed arcuate surfaces 38 and 39, respectively, of the cams, the switch arms 44 and 45 remain spring-biased to their upper positions, illustrated in Fig. 1. In these upper positions the switch arm 44 is in current-conducting relationship to conductors 46 and 47, but the circuit is open at switch arm 45, hence no current flows to relay 33 and the relay contact arms 31 and 32 remain spring-biased to the right as illustrated in Fig. 1, making contact with points 31b and 32b, respectively, and thus maintaining the stator windings of the synchros 18 and 19 interconnected for current flow therebetween, by way of the interconnections 27, 28 and 29. This is the "coupled" condition which normally prevails between the two synchros, to maintain elements 10 and 11 in corresponding angular positions as the element 10 is shuttled between its two limit positions by its actuating apparatus (not shown). However, when the equipment is put into operation after a period of idleness, or in other special situations, there may be a lack of synchronism in the respective angular positions of the members 10 and 11. On such occasions the relay 33 will be actuated in the manner now to be described.

It will be observed that the arcuate surface 38, extending from cam surface 40a to cam surface 40b, has an arcuate extent that is slightly less than that of arcuate surface 39, lying between cam surfaces 41a and 41b. Let it be assumed that the normal orbit of element 10 is an arc of 136 degrees, and that the arcuate lengths of surfaces 38 and 39 are 126 degrees and 136 degrees, respectively. Under this assumption it follows that switch pin 42 will be depressed (to open switch arm 44) twice during each shuttling cycle: first, by cam surface 40a as the cam 36 reaches its limit of motion in one direction, and then by cam surface 40b as the cam 36 reaches its limit of motion in the opposite direction. Switch pin 43, on the other hand, will not be depressed during such 136-degree swings, for the arcuate surface 39 is longer than surface 38, and just long enough to reach the switch pin 43, but not to depress it (see Fig. 2) as the cam 37 reaches the limit point of its normal swing cycle. Thus, although the first of the two serially connected switches remains in the circuit-closing position except at the limits of each normal swing, the second of the two switches remains open throughout each normal swing, thereby holding the relay 33 de-energized, and the circuits 27, 28 and 29 remain coupled.

With the parts proportioned as just described, the operation will be as follows: Assume that at the moment when the power lines 30 are connected to an energy source, the repeater rotor 17 falls in phase with generator rotor 16, but with the indicator shaft 11 thirty-six degrees angularly displaced with respect to the angle of driver element 10 (this being possible, if a multiplication ratio of 10 to 1 obtains in the gear trains 14 and 15). Under this assumption the continuing rotation of the rotors 16 and 17, in phase, will eventually drive cam 37 beyond its normal reversal point, thereby causing cam surface 41a (or 41b, as the case may be) to depress switch pin 43 to close switch 45 (see Fig. 3 or Fig. 4). If, at such a moment, cam 36 is at an intermediate point in its path (Fig. 3 or Fig. 4), both switches 44 and 45 will now be closed, hence current will flow to relay 33 and the synchros will be uncoupled by reason of the shifting of switch arms 31 and 32 off contacts 31b and 32b, and onto contacts 31a and 32a. This is the "zeroing" position of the relay switch 31, 32, and the result is a "locking" of the synchro rotor 17, hence of the indicator 11, in the limit position above described. The referred to "locking" occurs since the transfer of relay switch 31 and 32 places a short circuit on stator windings 21a, 21b and 21c, thereby effectively preventing rotation of rotor 23 in a manner that is well known in the art. Meanwhile synchro rotor 16 continues its rotation, in response to the continued rotation of driver 10, and eventually such continued rotation of driver 10 will carry cam surface 40a (or 40b, as the case may be) into engagement with switch pin 42 (see Fig. 5 or Fig. 6) to depress the latter and thereby re-open the path of current flow to relay 33. Thereupon, synchro-repeater 17 is "unlocked" by the re-coupling effect of the return of switch 31, 32 to the stator-coupling position illustrated in Fig. 1. The rotor 17 now re-commences rotation in phase with rotor 16, and indicator 11 is also in phase with driver 10—both being at the starting point of a new cyclic swing. Having thus established synchronism, the switch-operating cams 36 and 37 will maintain such synchronism, as the normal swing of cam 37 is insufficient to re-close the switch 45, hence relay 33 will not be re-energized by the periodic momentary closings of switch 44 at the limit of each normal swing.

In the foregoing description certain values have been assumed, namely, a periodic arcuate motion of 136 degrees, and a gear multiplication ratio of 10 to 1, to produce 3.8 revolutions (approximately) of the synchros for each cyclic swing of driver 10. Other values may be employed, of course; however, a certain relationship must be maintained between the arcuate extent of the shuttle stroke, on the one hand, and the gear ratio on the other. For example, a gear ratio of nine to one would not be feasible, since this would produce only 3.4 revolutions per cyclic swing (assuming the same swing arc of 136 degrees) and therefore it could produce a false unlocking action at a point which would be short of the "in-phase" position. The applicable rule is that the selected gear ratio must be such as will cause the indicator 11 to complete a swing when the synchro rotor 17 has moved through a distance which approaches an integral number of revolutions, and falls short of such integral number by less than a half revolution. Thus, with an indicator swing path of 136 degrees, a corresponding rotor cycle of 3.8 revolutions (or 6.8, or 7.6) would result in 100% accuracy, whereas a rotor cycle of 3.4 revolutions would not. In other words, the gear ratio (with the assumed swing arc) may be 10 to 1, 18 to 1, or 20 to 1—to cite a few examples only, and assuming sufficient torque development to overcome friction and other loading factors, whereas, on the other hand, a ratio of 9 to 1 would give rise to false readings, due to the likelihood that, upon re-establishment of the coupling circuits through switch contacts 31, 32 (in the manner above described), following an interval of uncoupling, the rotor 17 would tend to rotate in a direction away from synchronism, that is, to a position that would carry the indicator 11 further away from the normal path, rather than back to said path, since the "in-phase" position would be more readily reachable by such wrongly directed rotation if the rotor had not reached the half-way point in its cycle of revolution. For this reason, it is desirable to choose a gear ratio wherein $L=360N-n$, where "L" represents the total travel (in degrees) of the synchro rotor for each swing stroke of the shuttle member 10, "N" is an integer between 1 and 10, and "n" is another integer, whose magnitude is less than 180, and preferably also less than 90.

Fig. 7 shows an alternate arrangement of the circuit to relay 33 of Fig. 1. In this Fig. 7 the normal swing of arm 36a will open serially connected switches 42c and 42d, alternately, as the limit positions are reached, while switches 43c and 43d (connected in parallel) will both be normally open, but the closing of either switch 43c or 43d, upon over-travel of indicator 11, (under conditions above described) will cause energization of relay 33, with results as above described with reference to Fig. 1. Thus, striker arms 36a and 37a are functional equivalents of cams 36 and 37 of Fig. 1.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a system for reproducing, at an observation station, an alternately forward and reverse arcuate motion originating elsewhere, in combination, an arcuate motion-producing element, a current generator actuated by said arcuate element, a synchronous motor at said observation station, means including electrical connections for causing said synchronous motor to reproduce the motion of said generator, means for rendering said electrical connections ineffective when lack of angular correspondence occurs between said generator and motor, and means for re-establishing the effectiveness of said connections when said lack of angular correspondence has been eliminated.

2. A system as defined in claim 1, wherein said last-named means includes a switch-operating electromagnetic device, an energizing circuit leading to said device, a switch forming part of said energizing circuit, and means movable with said current generator for actuating said switch.

3. A system as defined in claim 1, wherein said last-named means includes a switch-operating electromagnetic device, an energizing circuit leading to said device, a pair of switches forming serially connected parts of said energizing circuit, and means movable with said current generator and said motor, respectively, for actuating said switches.

4. In a system for reproducing, at an observation station, an arcuate motion originating elsewhere, in combination, an arcuate element, an indicating element at said observation station, electrical means for causing said indicating element to reproduce the motion of said arcuate element, means for rendering said electrical means ineffective when lack of angular correspondence occurs between said two elements, and means for re-establishing the effectiveness of said electrical means when said lack of angular correspondence has been eliminated.

5. In a system for reproducing, at an observation station, an arcuate motion originating elsewhere, in combination, an arcuate element, an indicating element at said observation station, control means for causing said indicating element to reproduce the motion of said arcuate element, means for rendering said control means ineffective when lack of angular correspondence occurs between said two elements, and means for re-establishing the effectiveness of said control means when said lack of angular correspondence has been eliminated.

6. A system as defined in claim 5, wherein said last-named means includes a switch-operating device, actuating means for said switch-operating device, and means movable with said current generator for rendering said actuating means alternately effective and ineffective.

7. A system as defined in claim 5, wherein said last-named means includes a switch-operating device, actuating means for said switch-operating device, and electrically interconnected means individual to the respective elements for rendering said actuating means alternately effective and ineffective.

8. A system as defined in claim 5, wherein said last-named means includes a switch-operating device, actuating means for said switch-operating device, and electrically interconnected means individual to the respective elements for rendering said actuating means alternately effective and ineffective, said electrically interconnected means including a first switch element operable upon each cyclic swing of one of said elements, and a second switch element operable only upon travel of the other of said elements beyond its normal reversal point.

References Cited in the file of this patent

UNITED STATES PATENTS

| | | |
|---|---|---|
| 2,420,160 | Adamson | May 6, 1947 |
| 2,444,796 | Whalley et al. | July 6, 1948 |
| 2,476,873 | Jeffers | July 19, 1949 |
| 2,648,834 | Lohse | Aug. 11, 1953 |